United States Patent

[11] 3,590,961

| [72] | Inventor | Franklin B. Airheart<br>Granada Hills, Calif. |
|---|---|---|
| [21] | Appl. No. | 813,262 |
| [22] | Filed | Apr. 3, 1969 |
| [45] | Patented | July 6, 1971 |
| [73] | Assignee | Airheart Products, Inc.<br>Van Nuys, Calif. |

[54] CLOSED LOOP CALIPER TYPE DISC BRAKE AND SUPPORT MEANS THEREFOR
11 Claims, 16 Drawing Figs.

[52] U.S. Cl. .................................................. 188/73.4, 188/73.6
[51] Int. Cl. ...................................................... F16d 65/00
[50] Field of Search .......................................... 188/73.4, 73.5, 73.6, 73.3, 205.3, 71.1

[56] References Cited
UNITED STATES PATENTS

| 3,065,829 | 11/1962 | Bessler et al. ................. | 188/73.4 X |
| 3,199,632 | 8/1965 | Chouings ...................... | 188/73.4 |
| 3,207,268 | 9/1965 | Mossey ......................... | 188/73.4 X |
| 3,354,992 | 11/1967 | Cook et al. .................... | 188/72.4 |
| 3,464,523 | 9/1969 | Machek ......................... | 188/73.4 |

FOREIGN PATENTS

| 1,350,749 | 12/1963 | France ......................... | 188/73.4 |

Primary Examiner—George E. A. Halvosa
Attorney—White and Haefliger

ABSTRACT: The disclosure concerns a disc brake assembly of low-cost construction, as for example making use of metal stampings, and wherein a clamping part or parts including linings may be dropped into place in support members for retention, such members being themselves retained against separation while free for relative lateral shifting bringing the clamping parts into clamping engagement with opposite faces of a rotor.

INVENTOR.
FRANKLIN B. AIRHEART
By White & Haefliger
ATTORNEYS.

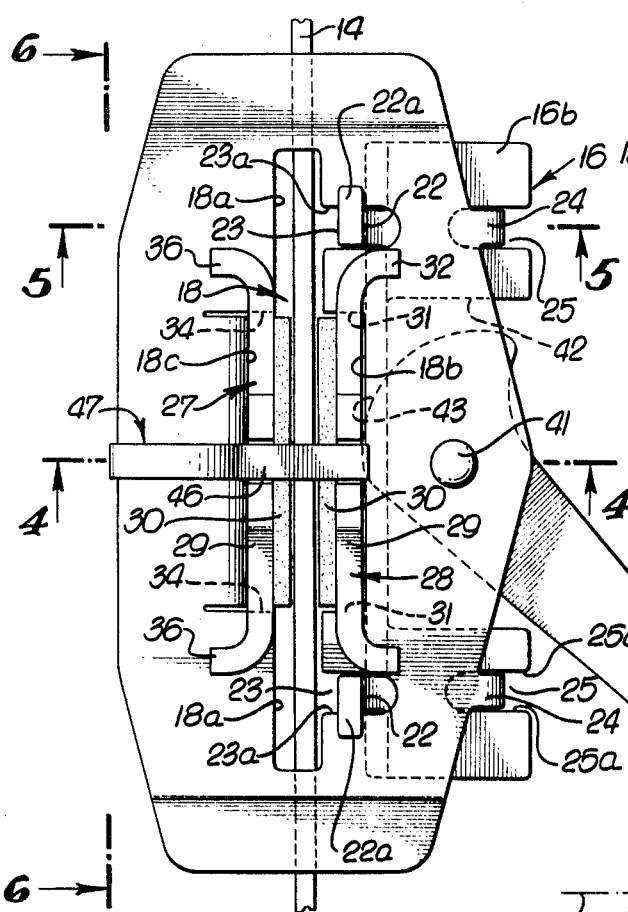
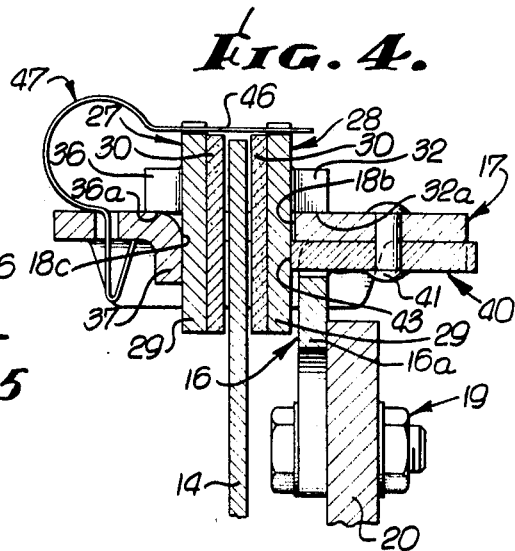
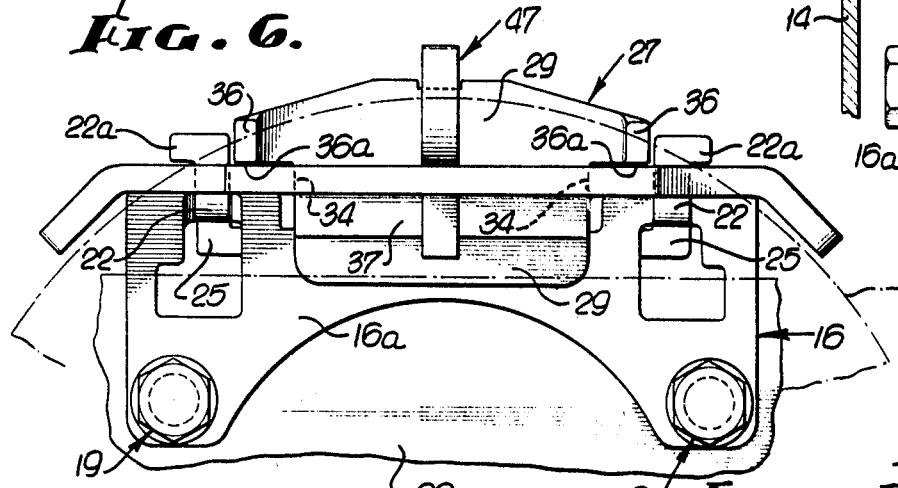
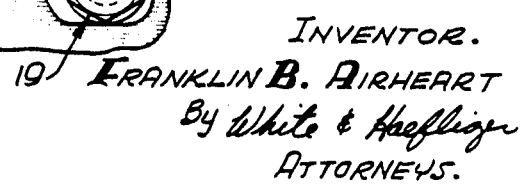

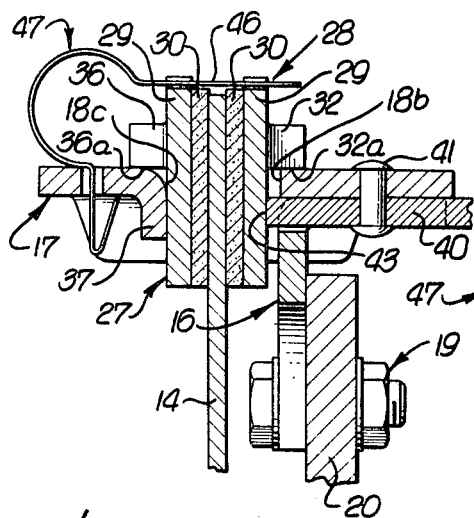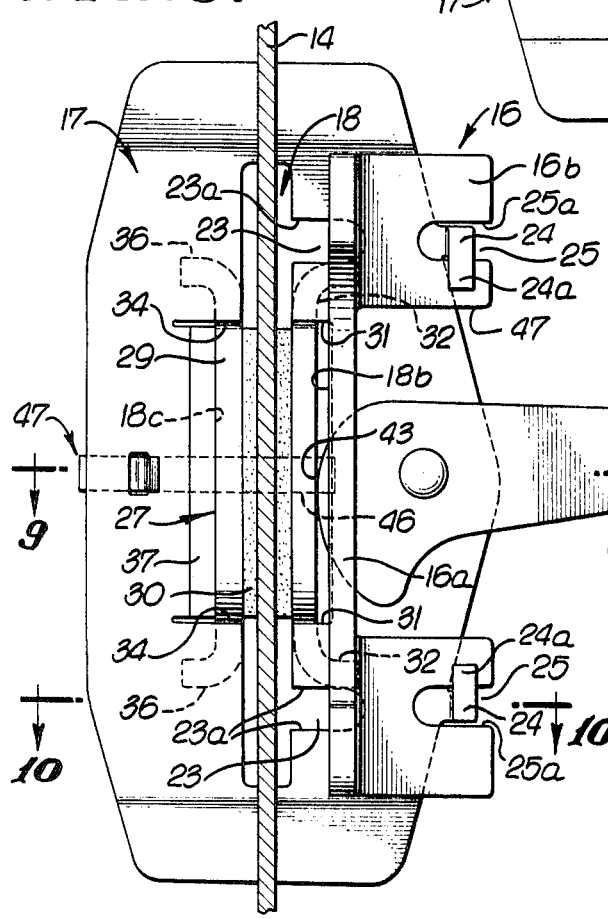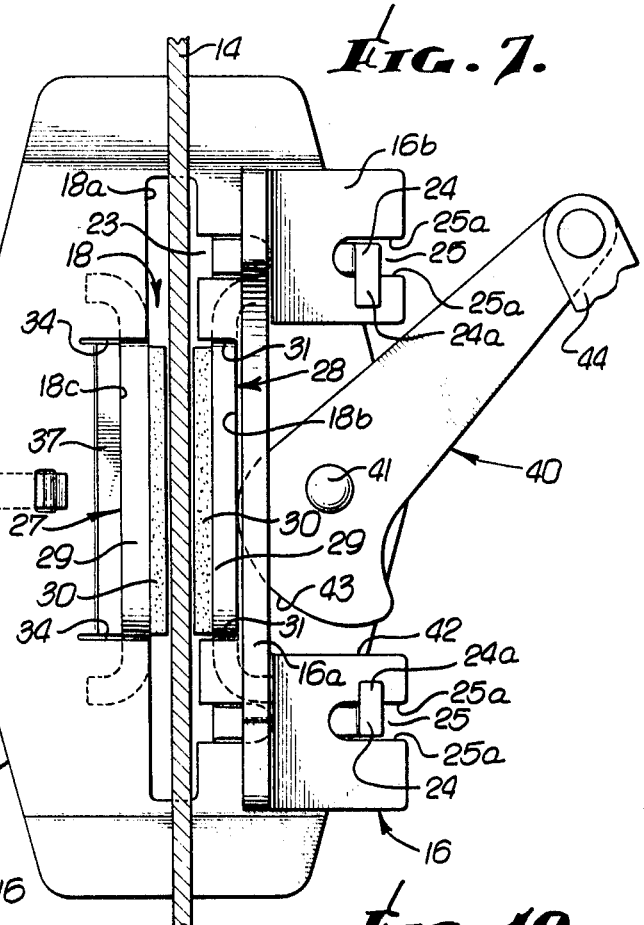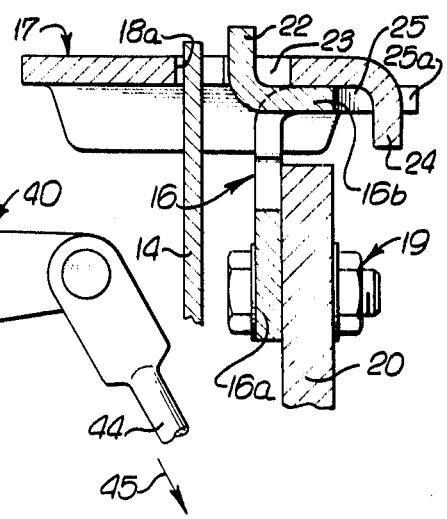

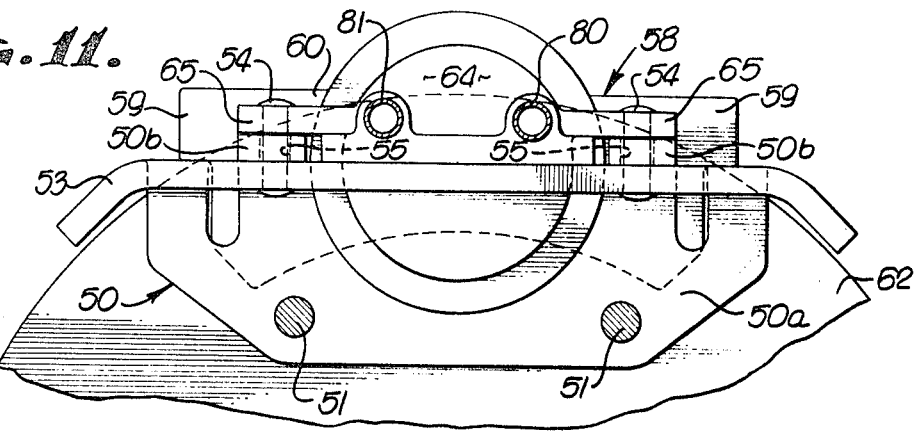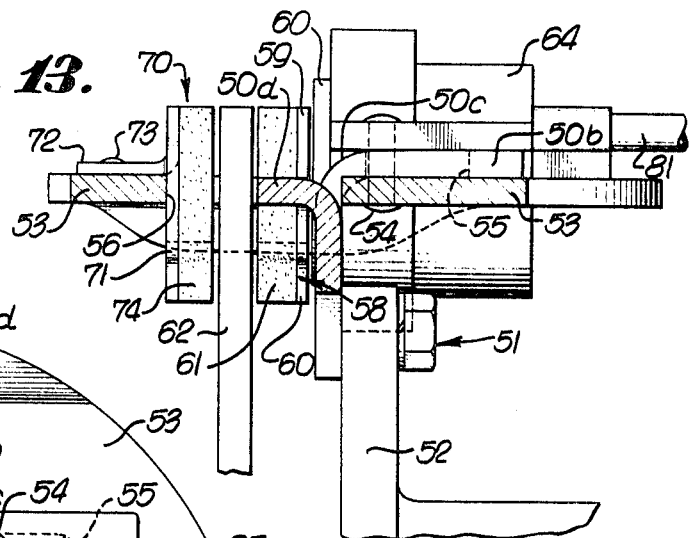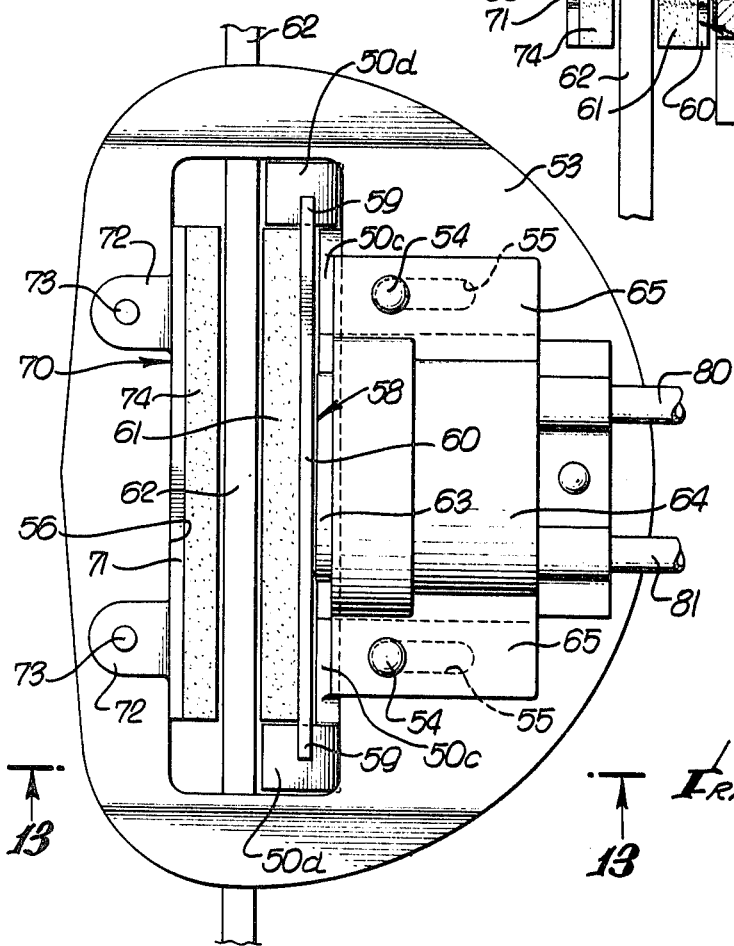

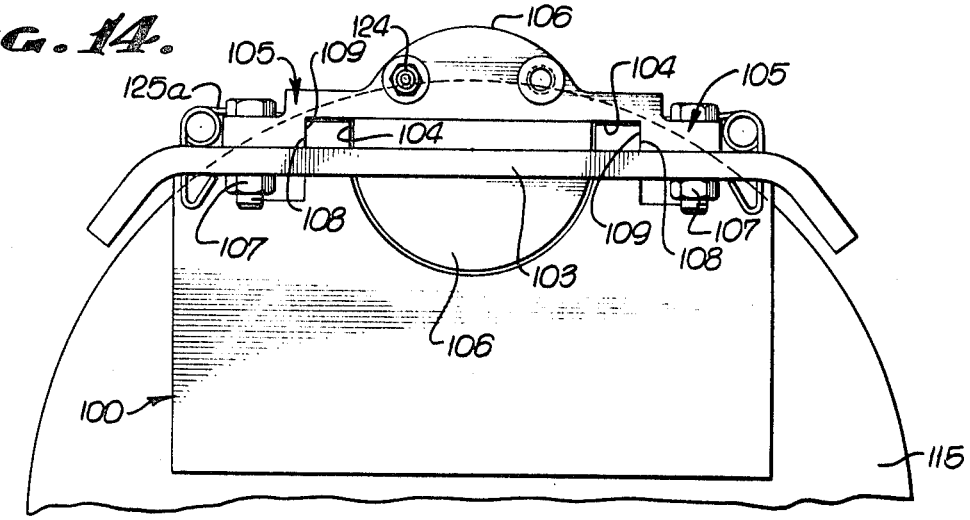
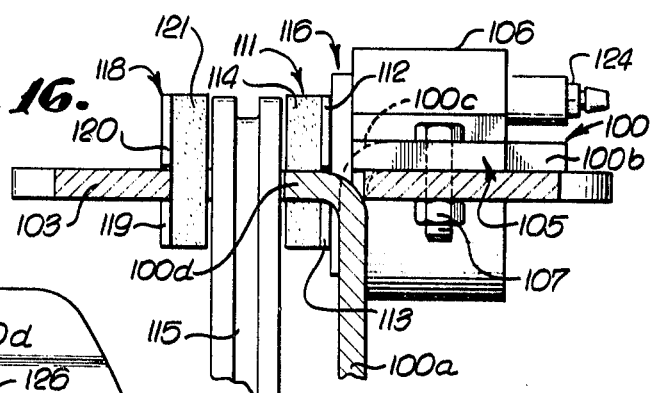

CLOSED LOOP CALIPER TYPE DISC BRAKE AND SUPPORT MEANS THEREFOR

BACKGROUND OF THE INVENTION

This invention relates generally to disc brakes, and more particularly concerns improvements having to do with brake lining wear compensation as well as lining replacement.

Disc brake installations typically involve the simultaneous forcing of brake linings against opposite faces of a rotating disc or rotor. In certain applications it is found that one of the linings may receive greater loading and hence greater wear than the opposite lining, requiring its replacement at more frequent intervals than would otherwise be necessary if the wear rates of both linings were equal. Further, the replacement of linings has been made undesirably time consuming and expensive by the manner in which the linings were mounted to the brake assembly.

SUMMARY OF THE INVENTION

It is a major object of the invention to provide solutions to the above problems through the provision of a disc brake assembly construction characterized by substantially equal rates of lining wear and by extreme ease of replacement of the linings. Another object of the invention is to provide a disc brake assembly of low-cost construction enabled by maximum utilization of metal stampings.

Basically, the invention is embodied in a disc brake assembly incorporating:
 a. a first assembly including a pair of support members retained against relative separation while being free for relative shifting in a lateral direction, at least one of said members having an opening therethrough;
 b. a pair of clamping parts having laterally spaced apart opposed surfaces for clamping engagement with opposite faces of a rotor received therebetween, at least one of said parts projecting through said opening and said parts being carried by said firs assembly for relative lateral guided movement while being retained against separation from the assembly; and
 c. actuating means projecting into lateral force transmitting relation with one of said parts to urge said part toward the other part for clamping the rotor and as accommodated by relative lateral shifting of said support member.

As will appear, the clamping parts, which may comprise like plates and linings, may be dropped into place within the opening in the one member or carrier plate, for ease of replacement; also, the lateral shifting of that plate during clamping of the disc facilities equal wear of the linings.

Other objects of the invention include the provision of interfitting lugs and slots in the two support members (for example carrier plate and bracket plate) to accommodate such relative lateral shifting while blocking separation thereof; and tongues on the clamping part or parts to seat those parts on the carrier plate and transmit loading to that plate in response to clamping of the disc, the tongues facilitating lateral shifting of at least one clamping part relative to the carrier plate and in response to actuator operation. Further, the actuator may comprise a lever, or fluid pressurized element, carried by the carrier plate in order to be shiftable laterally therewith, relative to the mounting member or bracket, as will appear.

These and other objects and advantages of the invention, as well as the details of illustrative embodiments, will be more fully understood from the following detailed description of the drawings, in which:

BRIEF DESCRIPTION OF THE DRAWINGS

FIG. 3 is an enlarged plan view taken on line 3-3 of FIG. 1, the disc not being clamped;

FIG. 4 is a section taken on line 4-4 of FIG. 3;

FIG. 5 is a section taken on line 5-5 of FIG. 3;

FIG. 6 is a view taken on line 6-6 of FIG. 3;

FIG. 7 is a bottom plan view of the FIG. 1 brake, prior to disc braking;

FIG. 8 is a view like FIG. 7, showing the brake clamping the disc;

FIG. 9 is a section taken on line 9-9 of FIG. 8;

FIG. 10 is a section taken on line 10-10 of FIG. 8;

FIG. 11 is a view like that of FIG. 2, but showing a modified brake assembly;

FIG. 12 is a top plan view of the FIG. 11 brake assembly;

FIG 13 is a section taken on line 13-13 of FIG. 12; and

FIGS. 14—16 are views like 11—13, showing another modification.

DESCRIPTION OF PREFERRED EMBODIMENTS

Figure 1:
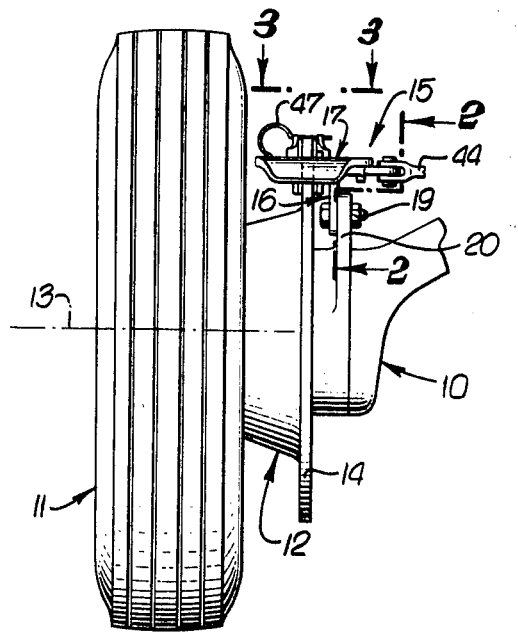
FIG. 1 is a vertical elevation illustrating application of the invention to a vehicle wheel and disc installation.
Figure 2:
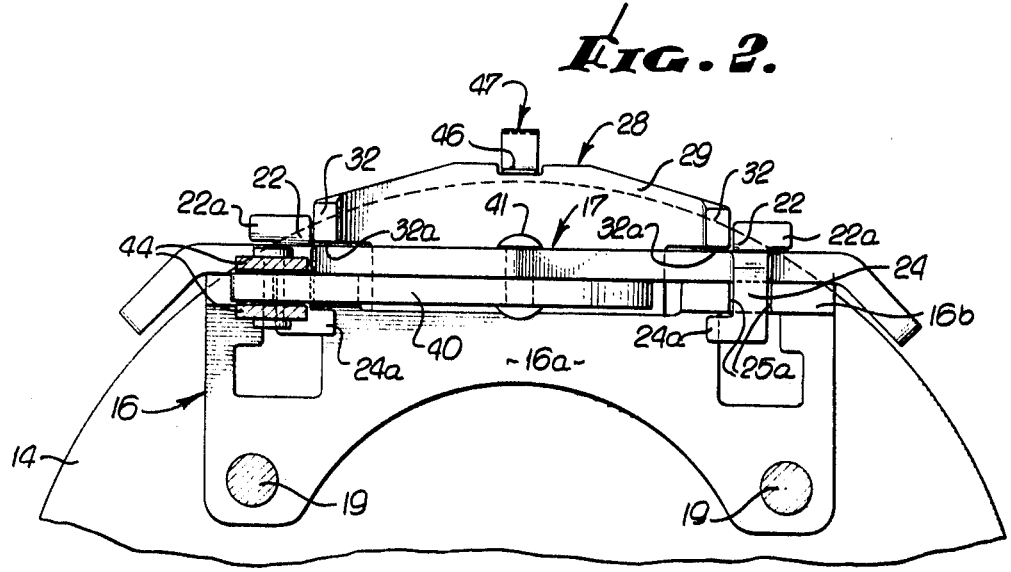
FIG. 2 is an enlarged elevation taken on line 2-2 of FIG. 1.

Referring first to FIG. 1, vehicle structure is seen at 10 for supporting a vehicle wheel 11 and hub 12 to rotate about an axle contained within the hub, the axis of rotation being indicated at 13. Attached to the hub is a rotor or disc 14, which also rotates about axis 13, and which is to be controllably clamped, as by means of the brake device 15 of the invention, for slowing wheel rotation.

The brake 15 includes what may be generally referred to as a first assembly comprising a pair of support members retained against relative separation while being free for relative shifting in a lateral direction, at least one of the members defining a through opening to receive a disc clamping part or parts. In the example seen in FIGS. 2—10, typical support members are seen at 16 and 17, the latter having a vertical through opening 18. Member 16 may advantageously have the form of an L-shaped mounting bracket comprising a vertical plate 16a attachable as by bolts 19 to rigid support flange 20 on structure 10, and a horizontal plate 16b spaced above and extending over that flange. Member 17 may advantageously have the form of a horizontal carrier plate supported by plate 16b to be shiftable laterally relative thereto, as in the directions of arrows 21 in FIG. 5.

Retention of the plates 16 and 17 against vertical separation may be afforded by tongues or lugs 22 integral with plate 16 and extending upwardly through lateral guide grooves or slots 23 in plate 17, the lug terminals 22a closely overhanging the upper surface of plate 17. Similarly, tongues or lugs 24 integral with plate 17 extend downwardly through lateral guide grooves or slots 25 in plate 16b, the lugs having terminals 24a closely underhanging the lower surface of plate 16b, as is clear from FIG. 2. The lateral dimensions of the slots and lugs are such (with slots 23 intersecting openings 18a) that upon assembly, the lugs 22 and terminals 22a on plate 16b are receivable relatively upwardly into end portions 18a of the openings 18 in plate 17, (at which time the lugs 24 are free of slots 25). Thereafter, relative lateral shifting of plates 16b and 17 brings the two pairs of lugs and slots into interfitting relation, as illustrated. In this regard slots 23 are formed by longitudinally spaced guide shoulders 23a, and likewise, slots 25 are formed by guide shoulders 25a. The widths of the slots are such as to afford loose guiding of the received lugs for lateral movement, while lugs 22 and associated guide shoulders 23a are longitudinally spaced apart, and lugs 24 and associated guide shoulders 25a are longitudinally spaced-apart to efficiently resist relative angular deflection of the plates 17 and 16b about a horizontal axis 26 in FIG. 5, in response to braking force application. Note further that the construction is such as to enable rapid and inexpensive fabrication of the plates, lugs and slots, for example by metal stamping.

The brake further includes what may generally be referred to as a pair of clamping parts having laterally spaced apart opposed surfaces for clamping engagement with opposite faces of the rotor or disc 14; at least one of the parts projecting through the opening 18 and the clamping parts being carried by the plate assembly for relative lateral guided movement while being retained against separation form the assembly. In FIGS. 2—10, the clamping parts 27 and 28 may advantageously (for replacement purposes) be alike and sized to be dropped into place into the enlarged central portion 18b of opening 18 and to seat on the top of carrier plate 17. In this regard, each part 27 and 28 comprises a metal plate 29 and a layer 30 of brake lining (typically nonmetallic) bonded to the plate to define the disc clamping surface adapted to slowly wear in use. Plates 29 may comprise metal stampings.

At least one of the clamping parts, as for example part 28, is constrained for lateral guided movement relative to the other clamping part, as by laterally extending guide shoulders 31 on the plate 17. Those shoulders are longitudinally spaced to define an elongated slot portion 18b of opening 18, into which the carrier plate 17 drops during assembly, slot 18b accommodating lateral movement of the part 28 in use, toward and away from disc 14. The plate 29 associated with that part has projecting tongues 32 forming shoulders 32a engageable against the top surface of plate 17 to seat the clamping part 28 on that plate during its interval movement, and to transmit to the plate force or torque developed in response to clamping of disc 14.

Likewise, part 27 also projects through and is drop-received into an elongated slot portion 18c of opening 18, portion 18c accommodating lateral shifting of part 27, in use. Slot portion 18c extends between laterally extending guide shoulders 34 (in alignment with shoulders 30), and plate 29 of part 27 is retained between those shoulders for lateral guided movement. That plate also has projecting tongues 36 forming shoulders 36a engageable against the top surface of plate 17 to seat the clamping part 27 on that plate during its lateral movement, and to transmit to the plate force or torque developed in response to clamping of disc 14. Note that an additional tongue portion 37 of plate 17 extends downwardly to provide an enlarged stop against which the plate 29 of part 27 may bear during braking force transmission, it being noted that plate 17 may shift laterally to an extent accommodating approximately equal clamping force transmission to the disc 14 via the linings 30, assuring balanced wear rates of the linings.

The brake also includes actuating means projecting into lateral force transmitting relation with one of the clamping parts for clamping the rotor or disc, lateral shifting of the top plate 17 accommodating such clamping. As illustrated the actuating means may advantageously comprise a lever 40 having pivotal connection at 41 to plate 17, a cutaway 42 in the lower plate 16b accommodating reception of a cam surface 43 on the lever in proximity to plate 29 of part 28. When linkage 44 is translated in the direction of arrow 45, the lever is pivoted to effect force exertion via cam face 43 against the clamping part 28, so that the disc 14 is clamped between linings 30, top plate 17 shifting laterally to equalize the lining wear. Clamp parts 27 and 28 may be held in dropped in position by yieldable means such as the arm 46 of bowed spring 47, one end of which is attached to plate 17 as shown in FIG. 4. When replacement of parts 27 and 28 is desired, arm 46 is deflected upwardly, and those parts may then be lifted out of opening 18 and quickly replaced.

Turning now to the modified brake seen in FIGS. 11—13, the first assembly includes support members one of which comprises an L-shaped mounting bracket 50 with vertical plate 50a attached by bolts 51 to support flange 52, and horizontal plate 50b. The other support member comprises a horizontal plate 53 attached as by fasteners 54 to plate 50b to be shiftable laterally relative thereto. Such shifting is for example accommodated by lateral guide slots 55. In this regard, plate 53 defines an enlarged opening 56 through which the curved connection 50c between plates 50a and 50b projects. In addition, lugs 50d on the bracket project as shown with longitudinal spacing to define a gap therebetween through which one clamping part 58 is dropped, that part also extending downwardly through the opening 56 in plate 53. Lugs 59 on plate 60 of part 58 seat on the bracket lugs 50d and support the clamping part during its lateral shifting movement carrying lining 61 into braking engagement with disc 62. Such movement is effected by an hydraulic actuator having a plunger 63 engageable with plate 60. The plunger is urged by hydraulic pressure in cylinder 64 mounted on and movable laterally with plate 53, as by the fasteners 54 as shown. In this regard flanges 65 support the cylinder 64 and are slidably mounted on bracket plate 50b.

The other clamping part 70 has a plate 71 with integral lugs 72 attached at 73 to plate 53. Lining 74 on plate 71 has braking engagement with the disc 62 in response to the combined lateral shifting of lining 61 to engage the opposite side of the disc and lateral shifting of plate 53 to compensate for wear of the linings, and also tending to equalize such wear.

Note fluid pressure supply and bleed lines 80 and 81 connected to the cylinder 64.

In the further modified brake seen in FIGS. 14—16, the first assembly includes support members one of which comprises an L-shaped mounting bracket 100 with vertical plate 100a suitably attached to a support flange, and horizontal plate ears 100b. The other support member comprises a horizontal plate 103 secured to ears 100b (as will be described) so as to be shiftable laterally relative thereto. Such shifting is accommodated by lateral reception of ears 100b in the lateral guide slot 104 formed between plate 103 and L-shaped flanges 105 integral with and projecting from hydraulic pressure cylinder 106 and secured by bolts 107 to plate 103. Note the outer lateral sides 108 of the ears engaging the inner lateral sides 109 of the flanges 105.

Plate 103 defines an enlarged opening 110 through which the curved connections 100c between ears 100b and plate 100a project, as seen in FIG. 15. In addition, lugs 100d on the bracket project as shown, with longitudinal spacing therebetween in FIG. 16 to define a gap through which one clamping part 111 is dropped into place, that part then extending downwardly through opening 110 in plate 103. Lugs 112 on plate 113 of part 111 slot on bracket lugs 100d and support that clamping part during its lateral shifting movement carrying lining 114 into braking engagement with rotary disc 115. Such movement is effected by a piston 116 associated with cylinder 106, and engageable with plate 113.

The other clamping part 118 has a plate 119 with integral lugs 120 that seat on plate 103, as seen in FIG. 15. Lining 121 on plate 119 has braking engagement with disc 115 in response to the combined lateral shifting of lining 114 to engage the opposite side of disc 115, and lateral shifting of plate 103 to compensate for wear of the linings, and also tending to equalize such wear. A fluid pressure supply line for the cylinder 106 is seen at 124. A pair of retainer springs 125 in the form of bails are attached to the underside of plate 103, and project upwardly through openings 126 therein and laterally over the lugs 112 and 120 to exert downward force on parts 111 and 118 to hold them in place. The spring arms 125a may be rocked upwardly and longitudinally away from the lugs 112 and 120 to free parts 118 and 111 for removal and replacement.

From the foregoing, it is clear that the configurations and assembly of the components are such as to enable their fabrication by metal stamping techniques.

I claim:
1. In a disc brake, the combination comprising
  a. a first assembly including a pair of support members free for relative shifting adjacent one another and in a lateral direction, at least one of said members having an opening therethrough,
  b. a pair of clamping parts having laterally spaced apart opposed surfaces for clamping engagement with opposite faces of a rotor received therebetween, at least one of said parts projecting through said opening and said parts being carried by said first assembly for relative lateral guided movement while being retained against separation from the assembly,
  c. actuating means projecting into lateral force transmitting relation with one of said parts to urge said part toward the other part for clamping the rotor and as accommodated by relative lateral shifting of said support members, and d. a first pair of longitudinally spaced tongue and groove connections extending laterally on said members and a second pair of longitudinally spaced tongue and groove guide connections extending laterally on said members, both pairs of connections acting as lateral guides and being at the same lateral side of said through opening but one pair of said connections being closer than the other pair to said opening so that the grooves of said one pair of connections merge with said opening, at least one pair of said connections also acting to block relative separation of the members.

2. The combination of claim 1 wherein said support members include an L-shaped bracket and a carrier plate mounted on the bracket.

3. The combination of claim 1 including said rotor in the form of a disc the outer portion of which projects between said opposed surfaces.

4. The combination of claim 1 including a cantilever spring arm carried by said one member and projecting over said parts to retain them in said opening, said arm being deflectable to permit removal of said parts from said opening.

5. The combination of claim 1 wherein said one member comprises a carrier plate carrying said clamping parts.

6. The combination of claim 5 wherein said actuator means comprises a lever having pivoted connection to the plate.

7. The combination of claim 5 wherein each of said parts comprises a plate and a layer of brake lining to define said clamping surfaces.

8. The combination of claim 7 wherein all of said plates consist of metal stampings.

9. The combination of claim 5 including tongues on said one part having longitudinally spaced shoulders engageable with the carrier plate to seat said part on the plate and to transmit to the plate force developed in response to clamping of the disc.

10. The combination of claim 9 wherein said other part also projects through said opening and including longitudinally spaced shoulders on said other part located to transmit force developed in response to clamping of said disc.

11. The combination of claim 10 wherein said opening is of sufficient width to permit withdrawal of said parts form said opening for replacement, and including yieldable means holding said parts assembled to said first assembly and projecting in said opening.